(12) United States Patent
Nohara et al.

(10) Patent No.: US 11,902,131 B2
(45) Date of Patent: Feb. 13, 2024

(54) DATA COLLECTION SYSTEM, RECEPTION-SIDE APPARATUS, AND DATA COLLECTION METHOD

(71) Applicant: DAIKIN INDUSTRIES, LTD., Osaka (JP)

(72) Inventors: Kenta Nohara, Osaka (JP); Gou Nakatsuka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/879,196

(22) Filed: Aug. 2, 2022

(65) Prior Publication Data

US 2022/0377001 A1 Nov. 24, 2022

Related U.S. Application Data

(63) Continuation of application No. PCT/JP2021/005037, filed on Feb. 10, 2021.

(30) Foreign Application Priority Data

Feb. 12, 2020 (JP) .................................. 2020-021261

(51) Int. Cl.
- *H04L 43/0829* (2022.01)
- *H04L 12/28* (2006.01)
- *F24F 11/58* (2018.01)

(52) U.S. Cl.
CPC ...... *H04L 43/0829* (2013.01); *H04L 12/2823* (2013.01); *F24F 11/58* (2018.01)

(58) Field of Classification Search
CPC . H04L 43/0829; H04L 12/2823; H04L 43/04; H04L 43/0817; H04L 43/0823; F24F 11/58

USPC .......................................................... 709/224
See application file for complete search history.

(56) References Cited

U.S. PATENT DOCUMENTS

| | | | |
|---|---|---|---|
| 11,107,177 B1 * | 8/2021 | Ashley | ...................... G06T 1/20 |
| 11,469,974 B1 * | 10/2022 | Cruise | .................. G06F 11/3006 |
| 11,569,935 B2 * | 1/2023 | Wetzker | ................ H04W 88/06 |

(Continued)

FOREIGN PATENT DOCUMENTS

| | | |
|---|---|---|
| JP | 2008-287569 A | 11/2008 |
| JP | 2014-154114 A | 8/2014 |

(Continued)

OTHER PUBLICATIONS

International Preliminary Report of corresponding PCT Application No. PCT/JP2021/005037 dated Aug. 25, 2022.

(Continued)

*Primary Examiner* — Karen C Tang
(74) *Attorney, Agent, or Firm* — Global IP Counselors, LLP

(57) ABSTRACT

A data collection system collects data of a monitoring target. The data collection system includes a transmission-side apparatus and a reception-side apparatus. The transmission-side apparatus includes an acquisition unit that acquires the data from the monitoring target, and a transmission unit that transmits the data if the data has changed. The reception-side apparatus includes a reception unit that receives the data from the transmission-side apparatus, and a determination unit that determines whether a data loss is present.

10 Claims, 9 Drawing Sheets

(56) References Cited

U.S. PATENT DOCUMENTS

| | | | |
|---|---|---|---|
| 2008/0170501 A1* | 7/2008 | Patel | H04W 28/14 370/235 |
| 2017/0238258 A1* | 8/2017 | Ramalho de Oliveira | H04W 52/0261 455/574 |
| 2018/0376357 A1* | 12/2018 | Tavares Coutinho | H04W 64/003 |
| 2019/0227112 A1* | 7/2019 | Keshet | G01R 31/088 |
| 2021/0241926 A1* | 8/2021 | Chor | H04L 67/12 |
| 2022/0036294 A1* | 2/2022 | Stevenson | H04Q 9/02 |

FOREIGN PATENT DOCUMENTS

| | | |
|---|---|---|
| JP | 2015-192449 A | 11/2015 |
| JP | 2018-22406 A | 2/2018 |
| JP | 2019-36764 A | 3/2019 |
| WO | 2018/084059 A1 | 5/2018 |

OTHER PUBLICATIONS

International Search Report of corresponding PCT Application No. PCT/JP2021/005037 dated May 11, 2021.
Yoshihiro Iwanaga; "Architecture of Smart Meter Telemetering Platform—IoT via SMF, a remote management technology -", IEICE technical report col. 115 No. 192, Aug. 18, 2015, Tokyo Japan.
European Search Report of corresponding EP Application No. 21 75 4608.4 dated Jul. 5, 2023.

* cited by examiner

DATA COLLECTION SYSTEM, RECEPTION-SIDE APPARATUS, AND DATA COLLECTION METHOD

CROSS-REFERENCE TO RELATED APPLICATIONS

This is a continuation of International Application No. PCT/JP2021/005037 filed on Feb. 10, 2021, which claims priority to Japanese Patent Application No. 2020-021261, filed on Feb. 12, 2020. The entire disclosures of these applications are incorporated by reference herein.

BACKGROUND

Technical Field

The present disclosure relates to a data collection system, a reception-side apparatus, and a data collection method.

Background Art

In the related art, a system that monitors a device by collecting data about the device is operated. Some of such systems include a transmission-side apparatus that is connected to the device and acquires the data from a sensor or the like mounted on the device, and a reception-side apparatus that collects the data acquired by the transmission-side apparatus.

For example, Japanese Unexamined Patent Publication No. 2015-192449 discloses a system in which a transmission-side apparatus acquires difference data of a monitoring target device and a reception-side apparatus converts the difference data into time-series data and analyzes the time-series data.

SUMMARY

A data collection system according to a first aspect is configured to collect data of a monitoring target. The data collection system includes a transmission-side apparatus and a reception-side apparatus. The transmission-side apparatus includes an acquisition unit configured to acquire the data from the monitoring target, and a transmission unit configured to transmit the data if the data has changed. The reception-side apparatus includes a reception unit configured to receive the data from the transmission-side apparatus, and a determination unit configured to determine whether a data loss is present.

DETAILED DESCRIPTION OF EMBODIMENT(S)

Hereinafter, a data collection system 1 according to the present disclosure will be described. Note that the following embodiment is a specific example and does not limit the technical scope, and can be changed as appropriate without departing from the spirit.

(1) Overall Configuration

Figure 1:
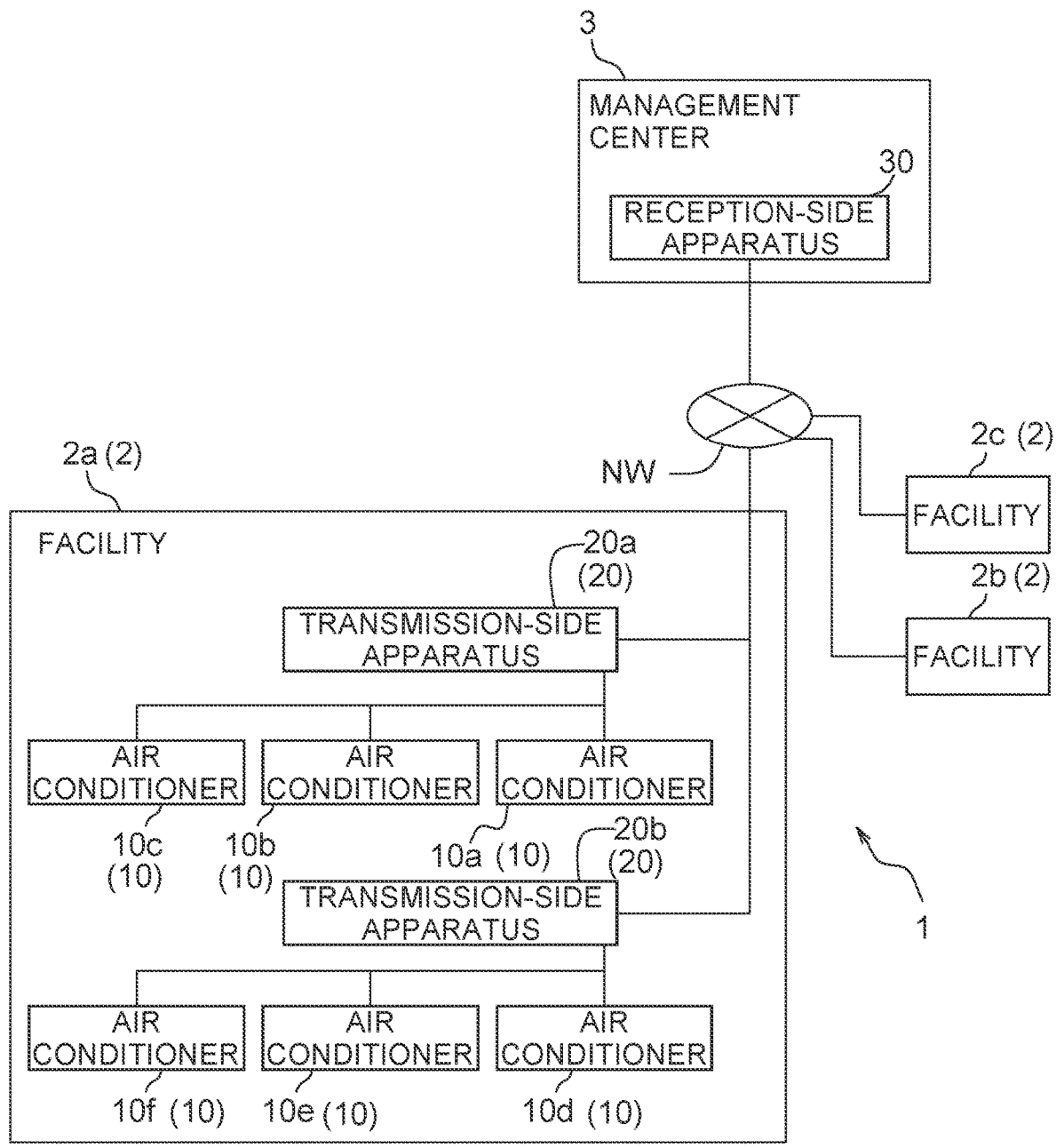
FIG. 1 is a schematic diagram illustrating a configuration of a data collection system.

FIG. 1 is a schematic diagram illustrating a configuration of the data collection system 1 according to the embodiment of the present disclosure. In the following description, in a description that is common to a plurality of apparatuses having substantially the same functions, they are denoted by the same reference numerals. When one apparatus is distinguished from a plurality of apparatuses having substantially the same functions, the apparatus is described with a suffix of a lower-case letter attached thereto. Although suffixes are used for convenience of description, they represent any given numbers, and the number is not limited thereto.

The data collection system 1 is a system that collects data x of a large number of monitoring targets by using one reception-side apparatus 30. Here, the reception-side apparatus 30 is installed in a central management center 3. A large number of facilities 2 (2a to 2c) are present in a jurisdiction area of the central management center 3. The facilities 2 are, for example, an office building, a commercial building, and a condominium. One or more air conditioners 10 (10a to 10f are installed in each of the facilities 2 as an example of a monitoring target. Any of a plurality of transmission-side apparatuses 20 (20a and 20b) is connected to each of the air conditioners 10. A plurality of air conditioners 10 may be connected to one transmission-side apparatus 20. In the data collection system 1, the reception-side apparatus 30 collects the data x of a monitoring object from each of the transmission-side apparatuses 20 and performs aggregation processing. This enables monitoring of the state of the monitoring target.

The reception-side apparatus 30 is connected to the transmission-side apparatuses 20 via a communication network NW. The communication network NW includes a wide area network (WAN) across a plurality of properties. For example, the communication network NW includes the Internet.

(2) Monitoring Target of Data Collection System

Hereinafter, an "air conditioner" that performs cooling or heating of a target space will be described as an example of the monitoring target of the data collection system 1 according to the present embodiment. However, the monitoring target of the data collection system 1 according to the present embodiment is not limited to an air conditioner.

Figure 2:
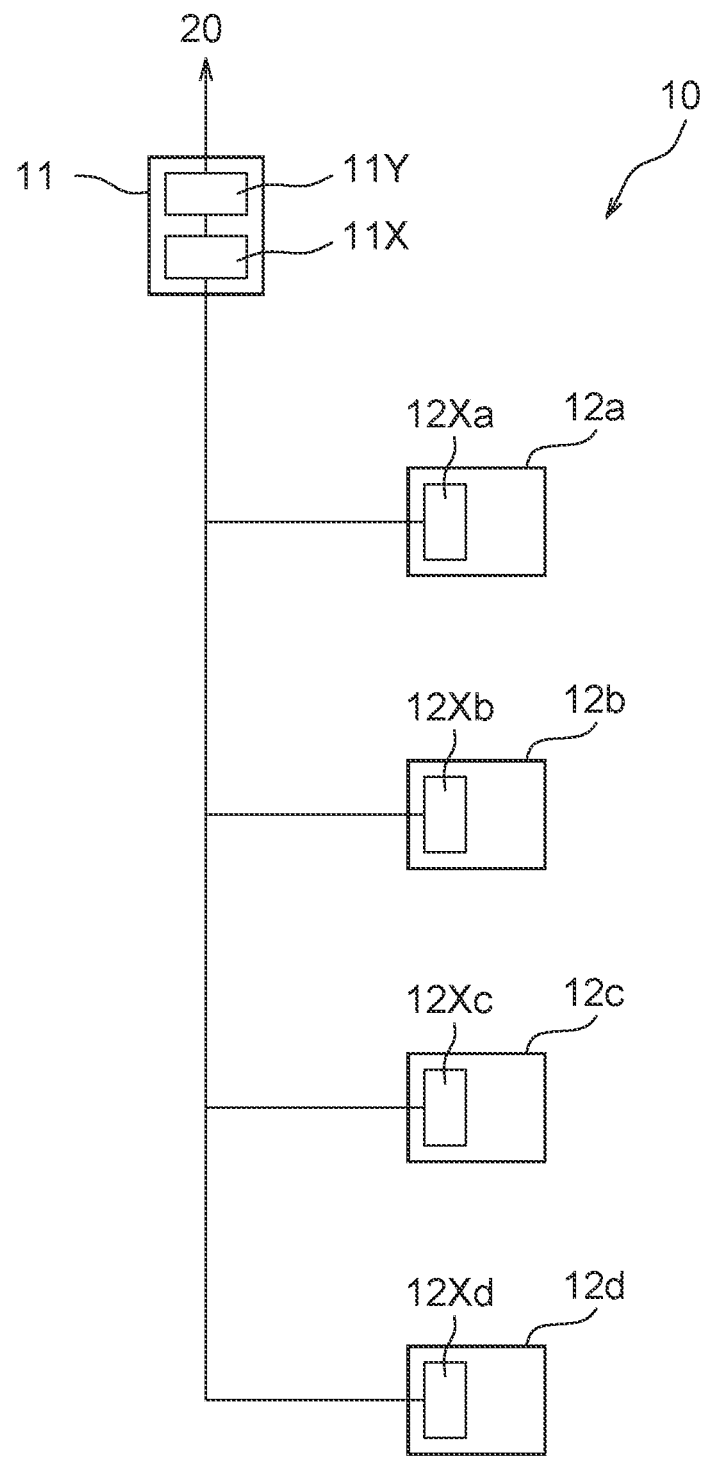
FIG. 2 is a schematic diagram illustrating a configuration of an air conditioner.

FIG. 2 is a schematic view illustrating a configuration of an air conditioner 10 according to the present embodiment. The air conditioner 10 includes a refrigerant circuit including a compressor, a heat exchanger, and the like (not illustrated). The air conditioner 10 includes an outdoor unit 11 and a plurality of indoor units 12 (12a to 12d). The outdoor unit 11 is a device that functions as a heat source of the refrigerant circuit and is installed, for example, on the rooftop or in a basement of the facility 2. The indoor units 12 perform cooling or heating of target spaces on the basis of an operation signal input from operation panels, remote controllers, or the like installed in rooms. For example, the indoor units 12a to 12d are dispersedly installed in installation spaces such as a plurality of floors or a plurality of rooms of the facility 2.

The outdoor unit 11 is provided with an outdoor control unit 11X. The outdoor control unit 11X includes a CPU, a memory, a communication interface, and the like (not illustrated). Each of the indoor units 12a to 12d is provided with a corresponding one of indoor control units 12Xa to 12Xd. Each of the indoor control units 12X includes a CPU, a memory, a communication interface, and the like (not illustrated). The outdoor control unit 11X and the indoor control unit 12X are connected via a dedicated communication line.

Various sensors are attached to the air conditioner 10 at predetermined positions as appropriate. These sensors detect current values of room temperature, ambient air temperature, temperature and pressure of refrigerant sucked into the compressor, temperature and pressure of refrigerant discharged from the compressor, temperature of refrigerant in an evaporator, temperature of refrigerant in a condenser, or the like.

The current values detected by the various sensors are respectively accumulated in the memory of the outdoor control unit 11X or the indoor control unit 12X for a predetermined period as "data x related to the air conditioner 10 (hereafter referred to as data x)". The acquired data x includes identification information of the air conditioner 10 (the outdoor unit 11 or the indoor unit 12) and information on the date and time when the data x is acquired. The data x is acquired, for example, at every predetermined time (for example, every one minute).

A connection unit 11Y is mounted on the outdoor unit 11. The data x is transmitted to a transmission-side apparatus 20 via the connection unit 11Y at every predetermined time. Alternatively, the data x is transmitted to the transmission-side apparatus 20 in response to a data transmission request acquired from the transmission-side apparatus 20 via the connection unit 11Y.

(3) Transmission-Side Apparatus 20

Figure 3:
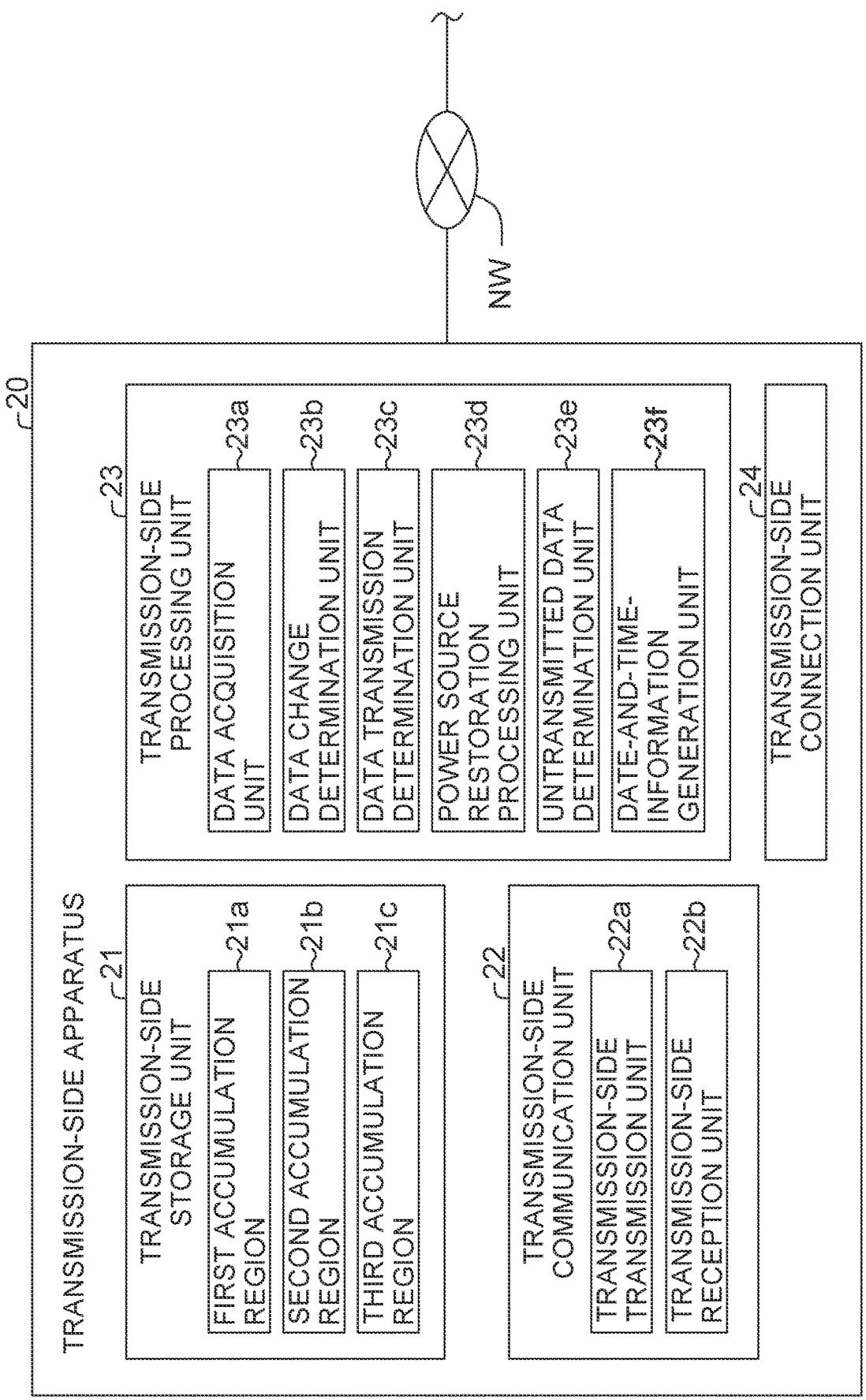
FIG. 3 is a schematic diagram illustrating a configuration of a transmission-side apparatus.

FIG. 3 is a schematic diagram illustrating a configuration of the transmission-side apparatus 20 according to the present embodiment. The transmission-side apparatus 20 collects the data x related to the air conditioner 10 by connecting to the outdoor control unit 11X. The transmission-side apparatus 20 is called an edge and is, for example, a server, a computer, or the like. As illustrated in FIG. 3, each of the transmission-side apparatuses 20 includes a transmission-side storage unit 21, a transmission-side communication unit 22, a transmission-side processing unit 23, and a transmission-side connection unit 24.

(3-1) Transmission-Side Storage Unit

The transmission-side storage unit 21 stores various types of information and includes a nonvolatile memory, a volatile memory, and the like. For example, the transmission-side storage unit 21 stores a program for executing various functions of the transmission-side apparatus 20 and various types of information for executing the program. The transmission-side storage unit 21 includes a first accumulation region 21a, a second accumulation region 21b, and a third accumulation region 21c. The first accumulation region 21a, the second accumulation region 21b, and the third accumulation region 21c are tables for accumulating the data x and are provided for each piece of the identification information of the air conditioner 10 (the outdoor unit 11 or the indoor unit 12) and for each type of data x. In the first accumulation region 21a, the second accumulation region 21b, and the third accumulation region 21c, the data x is stored in chronological order on the basis of the date-and-time information included in the data x. The data x accumulated in the first accumulation region 21a, the second accumulation region 21b, and the third accumulation region 21c can be updated as appropriate.

The first accumulation region 21a accumulates all the data x acquired from the air conditioner 10 via the transmission-side connection unit 24. That is, the data x accumulated in the first accumulation region 21a includes the data x accumulated in the second accumulation region 21b and the data x accumulated in the third accumulation region 21c.

The second accumulation region 21b accumulates the data x acquired from the air conditioner 10 if a data change determination unit 23b determines that the data x acquired from the air conditioner 10 has changed compared with the most recent data x stored in the first accumulation region 21a.

The data x accumulated in the second accumulation region 21b may be deleted from the second accumulation region 21b once the data x is transmitted to the reception-side apparatus 30. Alternatively, the data x accumulated in the second accumulation region 21b may be accumulated as untransmitted data if it has not yet been transmitted to the reception-side apparatus 30, and may be accumulated as transmitted data x if it has been transmitted to the reception-side apparatus 30.

The third accumulation region 21c accumulates the data x to be transmitted to the reception-side apparatus 30 if an abnormality in communication with the reception-side apparatus 30 is detected. In other words, the data x accumulated in the third accumulation region 21c is the data x that is accumulated in the second accumulation region 21b and that has failed to be normally transmitted to the reception-side apparatus 30 due to an abnormality in the communication with the reception-side apparatus 30. The data x accumulated in the third accumulation region 21c is associated with information on an accumulation start date and time and an accumulation end date and time to be described later.

The data x accumulated in the third accumulation region 21c may be deleted from the third accumulation region 21c once the data x is transmitted to the reception-side apparatus 30. Alternatively, the data x accumulated in the third accumulation region 21c may be accumulated as untransmitted data if it has not yet been transmitted to the reception-side apparatus 30, and may be accumulated as transmitted data x if it has been transmitted to the reception-side apparatus 30.

(3-2) Transmission-Side Communication Unit

The transmission-side communication unit 22 is a communication interface for performing communication with an external network including the communication network NW. The transmission-side communication unit 22 includes a transmission-side transmission unit 22a for transmitting the data x or the like to an external apparatus including the reception-side apparatus 30, and a transmission-side reception unit 22b for receiving a data transmission request or the like from the external apparatus. Communication processing performed via the transmission-side communication unit 22 (the transmission-side transmission unit 22a and the transmission-side reception unit 22b) is controlled by the transmission-side processing unit 23.

(3-3) Transmission-Side Processing Unit

The transmission-side processing unit 23 includes a CPU, a cache memory, and the like and executes various types of information processing. The transmission-side processing unit 23 includes a data acquisition unit 23a, the data change determination unit 23b, a data transmission determination unit 23c, a power source restoration processing unit 23d, an untransmitted data determination unit 23e, and a date-and-time-information generation unit 23f.

(3-3-1) Data Acquisition Unit

The data acquisition unit 23a acquires the data x from the air conditioner 10 via the transmission-side connection unit 24. The data x may be acquired by being automatically transmitted from the air conditioner 10 at every predetermined time, or may be acquired in response to the data acquisition unit 23a transmitting a data transmission request via the transmission-side connection unit 24. The data x acquired by the data acquisition unit 23a is stored in the first accumulation region 21a of the transmission-side storage unit 21. At the same time, the data change determination unit 23b performs processing of determining whether there is a change.

(3-3-2) Data Change Determination Unit

The data change determination unit 23b performs processing of determining whether the data x acquired from the air conditioner 10 via the transmission-side connection unit 24 has changed compared with the most recent data x stored in the first accumulation region 21a of the transmission-side storage unit 21. Here, the most recent data x stored in the first accumulation region 21a of the transmission-side storage unit 21 is the most recent data x in chronological order based on the date-and-time information included in each piece of the data x among a plurality of pieces of the data x accumulated in the first accumulation region 21a. In other words, the most recent data x stored in the first accumulation region 21a of the transmission-side storage unit 21 is the data x acquired immediately before the data x acquired from the air conditioner 10.

Figure 4:
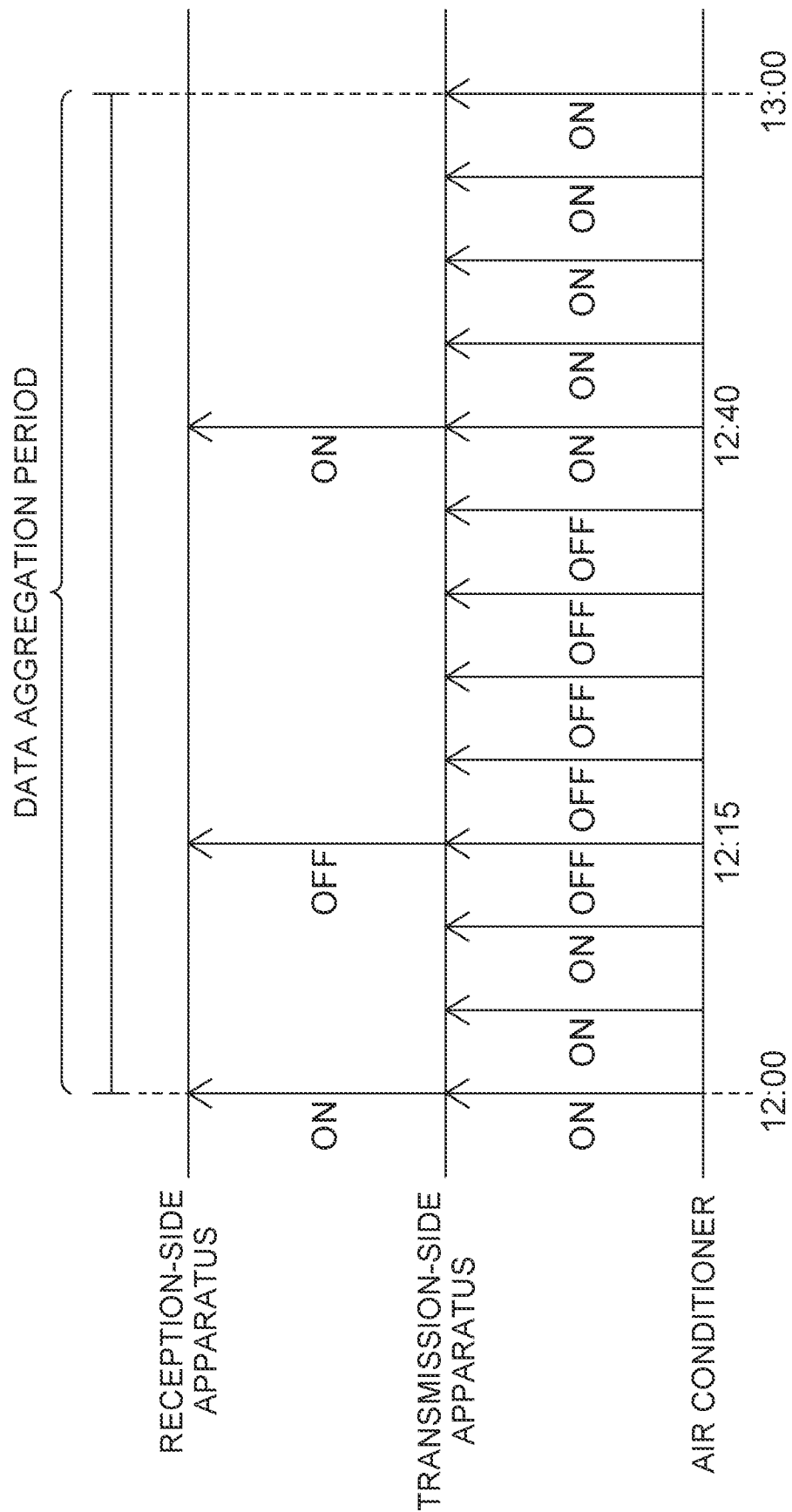
FIG. 4 is a schematic diagram illustrating an example of an aggregation period.

If the data change determination unit 23b determines that the data x acquired from the air conditioner 10 has changed compared with the most recent data x stored in the transmission-side storage unit 21, the data change determination unit 23b performs processing of accumulating the data x acquired from the air conditioner 10 in the second accumulation region 21b of the transmission-side storage unit 21. The data change determination unit 23b further performs processing of transmitting the data x that is determined to have changed, to the reception-side apparatus 30 via the transmission-side transmission unit 22a. On the other hand, if the data change determination unit 23b determines that the data x has not changed, the processing in the data change determination unit 23b is completed. In other words, if the data x acquired from the air conditioner 10 has changed, the data change determination unit 23b transmits the data x to the reception-side apparatus 30. For example, if the data acquisition unit 23a acquires the data x (the data x on a state related to power ON/OFF of the indoor unit 12a) every five minutes as illustrated in FIG. 4, the data change determination unit 23b transmits only the data x whose date-and-time information included in the data x is 12:00, 12:15, and 12:40 to the reception-side apparatus 30.

(3-3-3) Data Transmission Determination Unit

The data transmission determination unit 23c performs processing of determining whether the processing of transmitting the data x to the reception-side apparatus 30 is normally completed on the basis of the processing by the data change determination unit 23b. In other words, the data transmission determination unit 23c detects an abnormality in the communication with the reception-side apparatus 30 and determines whether the data x has been normally received by the reception-side apparatus 30. Here, the abnormality in communication is a state in which the transmission-side apparatus 20 is not capable of normally transmitting the data x to the reception-side apparatus 30, or a state in which the reception-side apparatus 30 is not capable of normally receiving the data x, and the communication between the transmission-side apparatus 20 and the reception-side apparatus 30 is interrupted.

Figure 5:
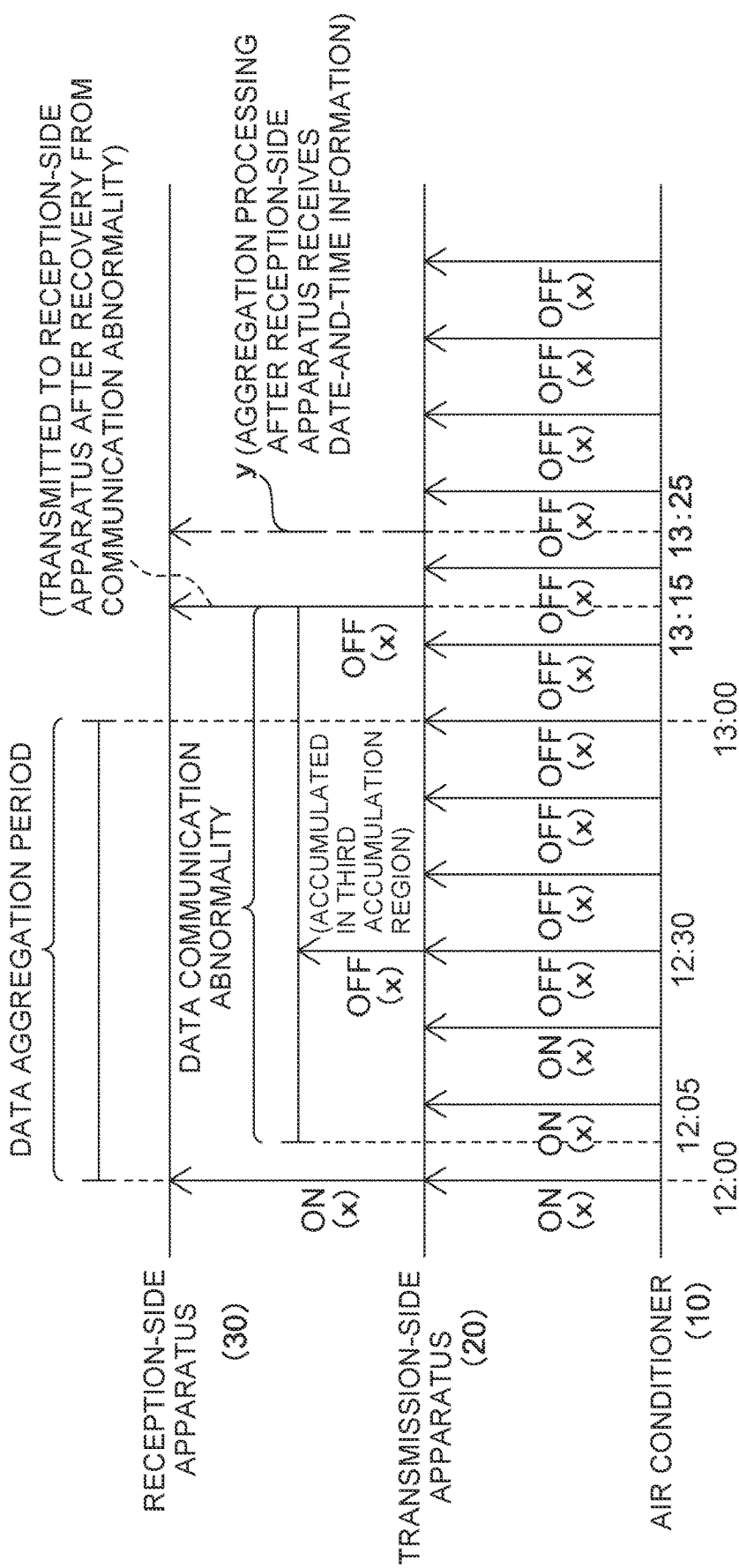
FIG. 5 is a schematic diagram illustrating an example of the aggregation period in a case where a communication abnormality occurs.

FIG. 5 is a schematic diagram illustrating a case where an abnormality occurs in the communication between the transmission-side apparatus 20 and the reception-side apparatus 30. If the data transmission determination unit 23c detects an abnormality in the communication with the reception-side apparatus 30, the data transmission determination unit 23c performs processing of accumulating, in the third accumulation region 21c of the transmission-side storage unit 21, the data x that has failed to be normally transmitted to the reception-side apparatus 30. For example, in FIG. 5, the data transmission determination unit 23c detects a communication abnormality that occurs at 12:05 in the communication with the reception-side apparatus 30. Therefore, at 12:30, the data transmission determination unit 23c performs processing of accumulating, in the third accumulation region 21c, the data x that has failed to be normally transmitted to the reception-side apparatus 30 (here, the data x indicating that the power was turned off).

On the other hand, if the data transmission determination unit 23c does not detect an abnormality in the communication with the reception-side apparatus 30 and the data x accumulated in the third accumulation region 21c of the transmission-side storage unit 21 is present, the data transmission determination unit 23c performs processing of transmitting the data x to the reception-side apparatus 30 via the transmission-side transmission unit 22a. In other words, if the abnormality in the communication with the reception-side apparatus 30 is recovered, the data transmission determination unit 23c transmits, to the reception-side apparatus 30, the data x accumulated in the third accumulation region 21c during a period in which the abnormality occurs in the communication. For example, in FIG. 5, the data transmission determination unit 23c detects that the communication state with the reception-side apparatus 30 recovered at 13:15. Therefore, at 13:15, the data transmission determination unit 23c transmits the data x accumulated in the third accumulation region 21c (the data x that has failed to be normally transmitted to the reception-side apparatus 30 at 12:30) to the reception-side apparatus 30.

The data transmission determination unit 23c acquires an accumulation start date and time when the accumulation of the data x in the third accumulation region 21c is started and an accumulation end date and time when the accumulation of the data x in the third accumulation region 21c is ended. The accumulation start date and time and the accumulation end date and time are associated with the data x accumulated in the third accumulation region 21c and transmitted to the reception-side apparatus 30.

(3-3-4) Power Source Restoration Processing Unit

Figure 6:
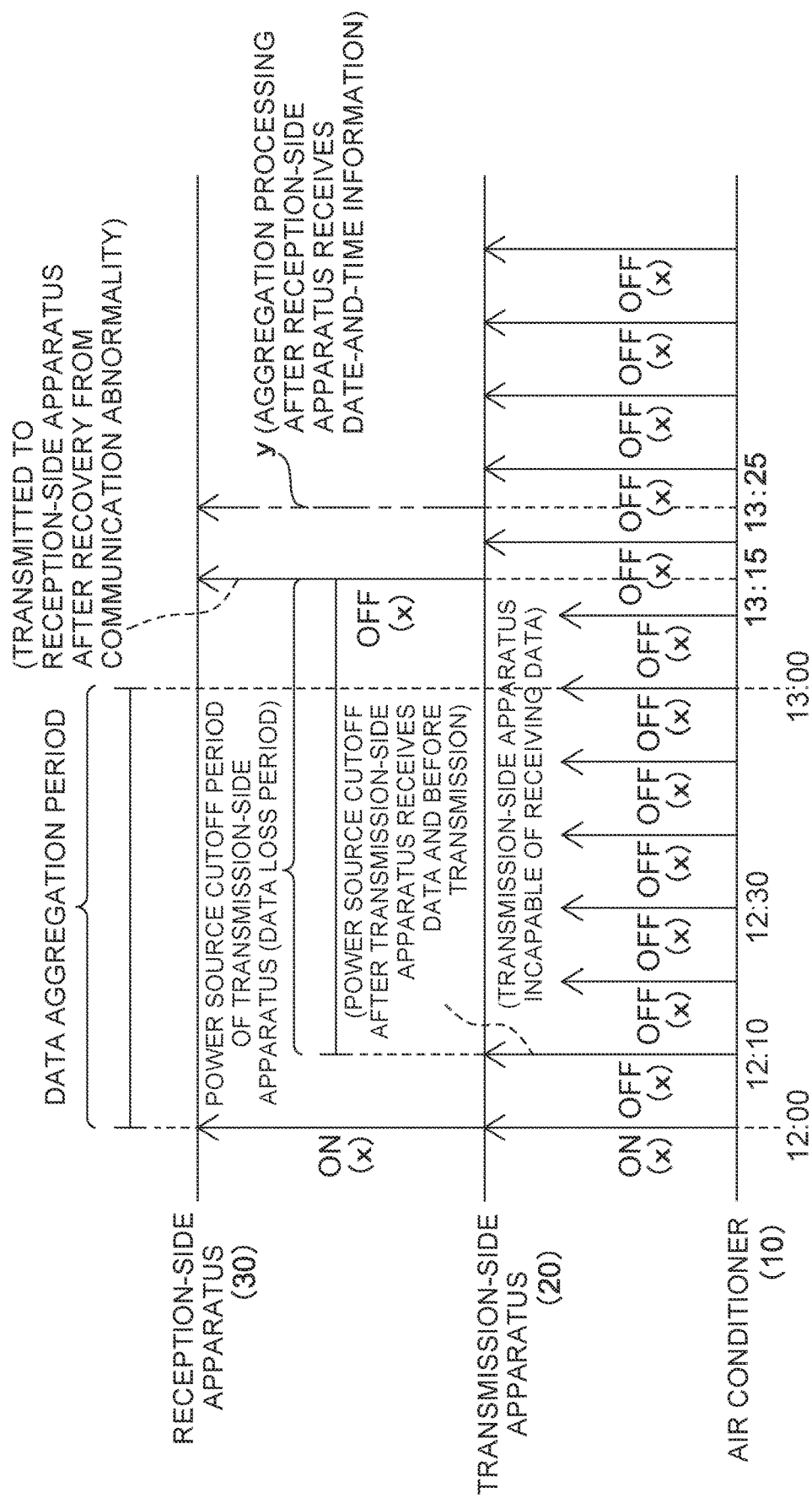
FIG. 6 is a schematic diagram illustrating an example of the aggregation period in a case where a power source is cut off.

FIG. 6 is a schematic diagram illustrating a case where the power source of the transmission-side apparatus 20 is recovered from a state where the power source is cut off. The power source restoration processing unit 23d performs power source restoration processing at a timing of recovery from a state where the power source of the transmission-side apparatus 20 is cut off. The power source restoration processing is processing of transmitting untransmitted data to the reception-side apparatus 30 via the transmission-side communication unit 22 if there is untransmitted data accumulated in the transmission-side storage unit 21. The power source restoration processing unit 23d can determine whether untransmitted data is present on the basis of the data x accumulated in the second accumulation region 21b and the third accumulation region 21c of the transmission-side storage unit 21. For example, in FIG. 6, the power source restoration processing unit 23d transmits the data x received at 12:10 to the reception-side apparatus 30.

The power source restoration processing unit 23d further transmits a data, transmission request to the air conditioner 10 via the transmission-side communication unit 22 as the power source restoration processing, and acquires the current values of the air conditioner 10. The current values of the air conditioner 10 are the data x related to the air conditioner 10 at a timing when the power source of the transmission-side apparatus 20 is recovered or at a timing when a predetermined period (for example, one minute) elapses after the power source of the transmission-side apparatus 20 is recovered. The power source restoration processing unit 23d performs processing of transmitting the current values acquired from the air conditioner 10 to the reception-side apparatus 30. The current values are stored in a fourth accumulation region 31a as one piece of the data x in the reception-side apparatus 30. The current values in FIG. 6 are current values based on the data transmission request transmitted from the power source restoration processing unit 23d to the air conditioner 10.

(3-3-5) Untransmitted Data Determination Unit

At a predetermined timing that is set in advance, the untransmitted data determination unit 23e performs processing of determining whether all the data x to be transmitted to the reception-side apparatus 30 has been transmitted. In other words, at the predetermined timing, the untransmitted data determination unit 23e determines whether untransmitted data is present. Here, the predetermined timing can be set to, for example, a predetermined time, every predetermined time, when an untransmitted data transmission request is received from the reception-side apparatus 30, or the like. The untransmitted data determination unit 23e determines whether untransmitted data is present on the basis of the data x accumulated in the second accumulation region 21b and the third accumulation region 21c of the transmission-side storage unit 21. If it is determined that untransmitted data is present, the untransmitted data determination unit 23e performs processing of transmitting the untransmitted data to the reception-side apparatus 30.

(3-3-6) Date-and-Time-Information Generation Unit

At a predetermined timing that is set in advance, the date-and-time-information generation unit 23f generates date-and-time information y indicating that all the data x up to a predetermined period has been transmitted to the reception-side apparatus 30. The predetermined timing can be set to, for example, a predetermined time, every predetermined time, or the like. The date-and-time information y includes date-and-time information at the predetermined timing. The date-and-time information y generated by the date-and-time-information generation unit 23f is transmitted to the reception-side apparatus 30 via the transmission-side communication unit 22.

For example, if an abnormality occurs in the communication between the transmission-side apparatus 20 and the reception-side apparatus 30 at the predetermined tuning, the date-and-time-information generation unit 23f generates the date-and-time information y at a timing after recovery from the communication abnormality and transmission of the untransmitted data to the reception-side apparatus 30. For example, if the power source of the transmission-side apparatus 20 is cut off at the predetermined timing, the date-and-time-information generation unit 23f generates the date-and-time information y at a timing after restoration from the power source cut off and transmission of the untransmitted data to the reception-side apparatus 30.

For example, in the case of FIG. 4 where there is no abnormality in the communication between the transmission-side apparatus 20 and the reception-side apparatus 30 and the power source of the transmission-side apparatus 20 is not cut off, the date-and-time-information generation unit 23f generates the date-and-time information y at 13:00 and transmits the date-and-time information y to the reception-side apparatus 30. For example, in the case of FIG. 5 where there is an abnormality in the communication between the transmission-side apparatus 20 and the reception-side apparatus 30, at a timing (here, 13:25) after the data transmission determination unit 23c detects that the communication state with the reception-side apparatus 30 has recovered and transmits the data x accumulated in the third accumulation region 21c of the transmission-side storage unit 21 to the reception-side apparatus 30, the date-and-time-information generation unit 23f generates the date-and-time information y and transmits the date-and-time information y to the reception-side apparatus 30. In the case of FIG. 6 in which there is a power source cutoff period of the transmission-side apparatus 20, at a timing (here, 13:25) after the power source restoration processing unit 23d performs the power source restoration processing, the date-and-time-information generation unit 23f generates the date-and-time information y and transmits the date-and-time information y to the reception-side apparatus 30.

(3-4) Connection Unit

The transmission-side connection unit 24 is an interface for connection to the connection unit 11Y of the outdoor unit 11. The transmission-side apparatus 20 can acquire the data x from the outdoor control unit 11X via the transmission-side connection unit 24. In addition, the transmission-side apparatus 20 can transmit a data transmission request to the outdoor control unit 11X via the transmission-side connection unit 24.

(4) Reception-Side Apparatus

Figure 7:
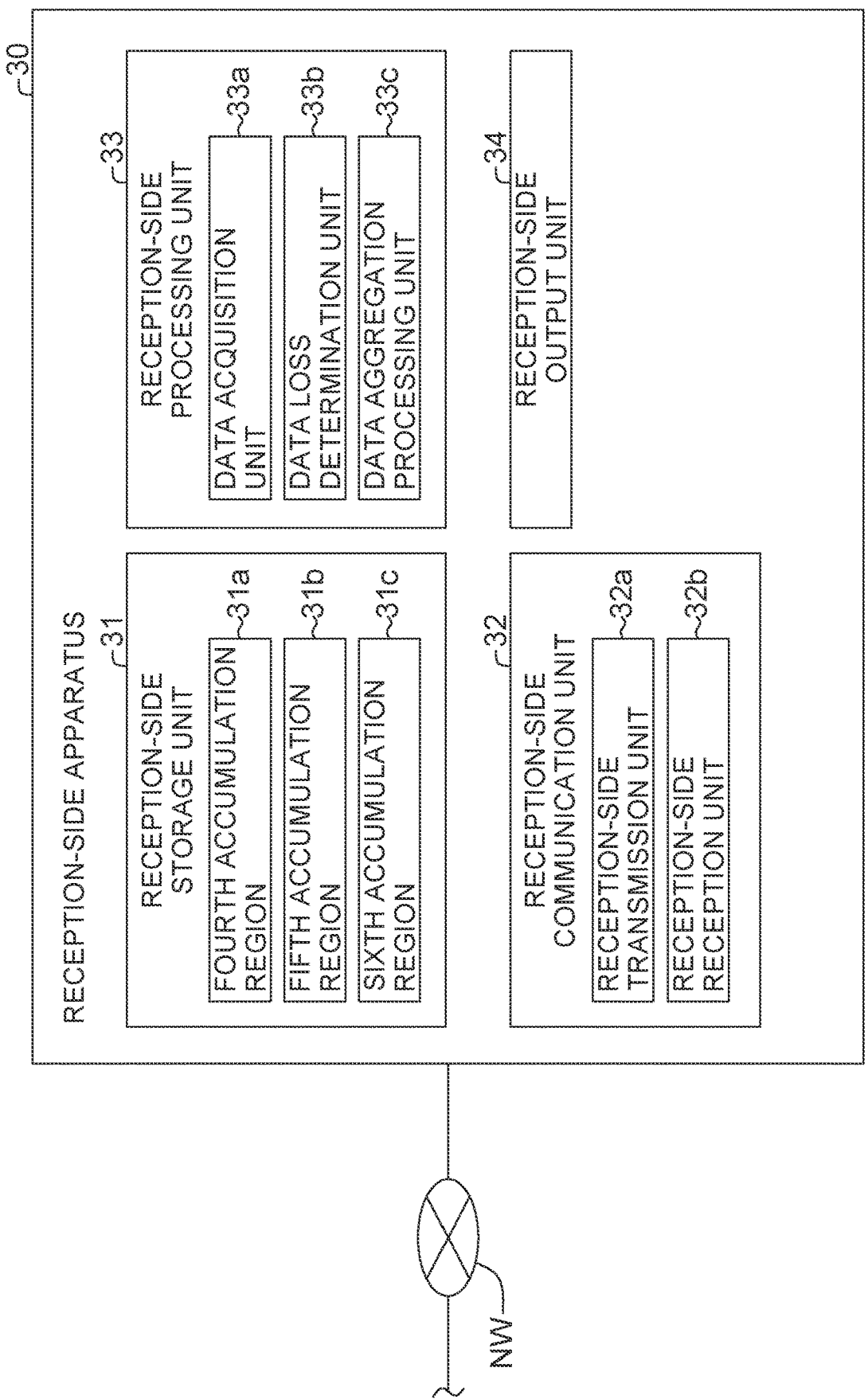
FIG. 7 is a schematic diagram illustrating a configuration of a reception-side apparatus.

A reception-side apparatus 30 illustrated in FIG. 7 is connected to each of one or more transmission-side apparatuses 20 via the communication network NW, collects the data x of the plurality of air conditioners 10, and performs aggregation processing. The reception-side apparatus 30 is, for example, a supercomputer, a workstation, a personal computer, a tablet device, a smartphone, or the like. Further, for example, the reception-side apparatus 30 may be configured by a plurality of computers or devices connected via a network.

As illustrated in FIG. 7, the reception-side apparatus 30 includes a reception-side storage unit 31, a reception-side communication unit 32, a reception-side processing unit 33, and a reception-side output unit 34.

(4-1) Reception-Side Storage Unit

The reception-side storage unit 31 stores various types of information and includes a ROM, a RAM, a hard disk, and/or the like. Here, the reception-side storage unit 31 stores programs for executing various functions of the reception-side apparatus 30 and various types of information for executing the programs. The reception-side storage unit 31 includes a fourth accumulation region 31a, a fifth accumulation region 31b, and a sixth accumulation region 31c. The fourth accumulation region 31a, the fifth accumulation region 31b, and the sixth accumulation region 31c are tables for accumulating the data x and are provided for each piece of the identification information of the air conditioner 10 (the outdoor unit 11 or the indoor unit 12) and for each type of data x. In the fourth accumulation region 31a, and the fifth accumulation region 31b, the data x is preferably stored in chronological order on the basis of the date-and-time information included in the data x.

The fourth accumulation region 31a accumulates all the data x received from the transmission-side apparatus 20 via the reception-side communication unit 32.

The fifth accumulation region 31b accumulates an aggregate of the data x for a predetermined period that is set in advance in the data x received from the transmission-side apparatus 20 via the reception-side communication unit 32. Here, the aggregate of the data x is one or more pieces of the data x acquired in a predetermined period on the basis of the date-and-time information included in the data x.

The sixth accumulation region 31c accumulates the data x subjected to aggregation processing in the reception-side processing unit 33.

(4-2) Reception-Side Communication Unit

The reception-side communication unit 32 is a communication interface for performing communication with an external network including the communication network NW. The reception-side communication unit 32 includes a reception-side transmission unit 32a for transmitting a data transmission request or the like to an external apparatus including the transmission-side apparatus 20, and a reception-side reception unit 32b for receiving the data x from the external apparatus. Communication processing performed via the reception-side communication unit 32 (the reception-side transmission unit 32a and the reception-side reception unit 32b) is controlled by the reception-side processing unit 33.

(4-3) Reception-Side Processing Unit

The reception-side processing unit 33 includes a CPU, a cache memory, and the like and executes various types of information processing. The reception-side processing unit 33 includes a data acquisition unit 33a, a data loss determination unit 33b, and a data aggregation processing unit 33c.

(4-3-1) Data Acquisition Unit

The data acquisition unit 33a acquires the data x from the transmission-side apparatus 20 via the reception-side communication unit 32. The data x acquired by the data acquisition unit 33a is accumulated in the fourth accumulation region 31a of the reception-side storage unit 31.

(4-3-2) Data Loss Determination Unit

The data loss determination unit 33b performs processing of determining whether a data loss is present in the data x acquired by the data acquisition unit 33a and processing of determining a data loss period. Here, the data loss is a state in which the data x is failed to be normally received from the transmission-side apparatus 20. In other words, this means a state in which the data x to be accumulated in the fifth accumulation region 31b of the reception-side storage unit 31 is not accumulated.

The data loss determination unit 33b performs determination processing in a period up to the date-and-time information y at a timing when the date-and-time information y generated by the date-and-time-information generation unit 23f of the transmission-side apparatus 20 is received.

First, the data loss determination unit 33b performs simple determination processing of determining whether a data loss is present on the basis of information about a communication state. The information about the communication state is, for example, information indicating that the communication with the transmission-side apparatus 20 is normal until a predetermined time. The data loss determination unit 33b can simply determine that there is no data loss until the predetermined time on the basis of the information indicating that the communication with the transmission-side apparatus 20 has been normal until the predetermined time. Alternatively, the information about the communication state is information on a time at which an abnormality occurs in the communication with the transmission-side apparatus 20. The data loss determination unit 33b can simply determine that there is a possibility of a data loss up to the predetermined time on the basis of the information on the time at which the abnormality occurs in the communication with the transmission-side apparatus 20. In response to this determination, the data loss determination unit 33b can transmit an untransmitted data transmission request to the transmission-side apparatus 20.

The data loss determination unit 33b further performs processing of determining whether a data loss is present and a data loss occurrence period in more detail on the basis of the information on the time at which the abnormality occurs in the communication with the transmission-side apparatus 20, information on the accumulation start date and time and the accumulation end date and time associated with the untransmitted data received from the transmission-side apparatus 20, and the date-and-time information y generated by the date-and-time-information generation unit 23f of the transmission-side apparatus 20. In other words, the data loss determination unit 33b determines whether there is a period in which the reception-side apparatus 30 does not acquire the data x, that is, whether a data loss is present, on the basis of the information on the accumulation start date and time and the accumulation end date and time of the accumulation data received from the transmission-side apparatus 20 as untransmitted data during a period in which the abnormality occurs in the communication with the transmission-side apparatus 20 and the date-and-time information y indicating that the transmission-side apparatus 20 has transmitted the data x up to the date and time generated by the date-and-time-information generation unit 23f.

For example, in FIG. 5, the data loss determination unit 33b performs processing of determining whether a data loss is present and the data loss occurrence period in more detail on the basis of the information indicating that the time at which the abnormality occurs in the communication with the transmission-side apparatus 20 is 12:05, information indicating that the accumulation start date and time associated with untransmitted data received from the transmission-side apparatus 20 is 12:05 and the accumulation end date and time associated with untransmitted data received from the transmission-side apparatus 20 is 13:15, and the date-and-time information y (information indicating that all the data x up to 13:25 has been transmitted) generated by the date-and-time-information generation unit 23f of the transmission-side apparatus 20. Here, the data loss determination unit 33b determines that there is no data loss because all the untransmitted data from the time at which the abnormality occurs in the communication with the transmission-side apparatus 20 to the time at which the communication abnormality is recovered is accumulated and receivable.

For example, in FIG. 6, the data loss determination unit 33b performs processing of determining whether a data loss is present and the data loss occurrence period in more detail on the basis of the information indicating that the time at which the abnormality occurs in the communication with the transmission-side apparatus 20 (communication abnormality due to power source cutoff of the transmission-side apparatus 20) is 12:10 and the date-and-time information y (information indicating that all the data up to 13:25 has been transmitted) generated by the date-and-time-information generation unit 23f of the transmission-side apparatus 20. Here, since the data in the power source cutoff period of the transmission-side apparatus 20 is not accumulated in the transmission-side apparatus 20, the data loss determination unit 33b does not receive the data as untransmitted data. Further, on the basis of the date-and-time information y (information indicating that all the data up to 13:25 have been transmitted) generated by the date-and-time-information generation unit 23f of the transmission-side apparatus 20, the data loss determination unit 33b determines that there is no additional data to be transmitted from the transmission-side apparatus 20 even after waiting further, that is, that all the data acquired by the transmission-side apparatus 20 has been received. As a result, the data loss determination unit 33b determines that the corresponding period (12:10 to 13:00) is the data loss period in the data aggregation period (12:00 to 13:00).

An aggregate of data subjected to determination processing of whether a data loss is present in the data loss determination unit 33b and determination processing of the data loss period is subjected to aggregation processing by the data aggregation processing unit 33c. One or more pieces of the data x received by the reception-side apparatus 30 are not subjected to the aggregation processing unless the reception-side apparatus 30 receives the date-and-time information y.

(4-3-3) Data Aggregation Processing Unit

The data aggregation processing unit 33c performs aggregation processing of the data aggregate (one or more pieces of the data x) accumulated in the fifth accumulation region 31b. The aggregation processing is processing that is set in advance for each piece of the identification information of the air conditioner 10 (the outdoor unit 11 or the indoor unit 12) and for each type of data x. The data aggregate subjected to the aggregation processing in the data aggregation processing unit 33c is accumulated in the sixth accumulation region 31c of the reception-side storage unit 31.

(4-4) Reception-Side Output Unit

The reception-side output unit 34 outputs various types of information and includes various displays, speakers, and the like. For example, the reception-side output unit 34 can output the data aggregate accumulated in the sixth accumulation region 31c.

(5) Processing in Data Collection System

Figure 8:
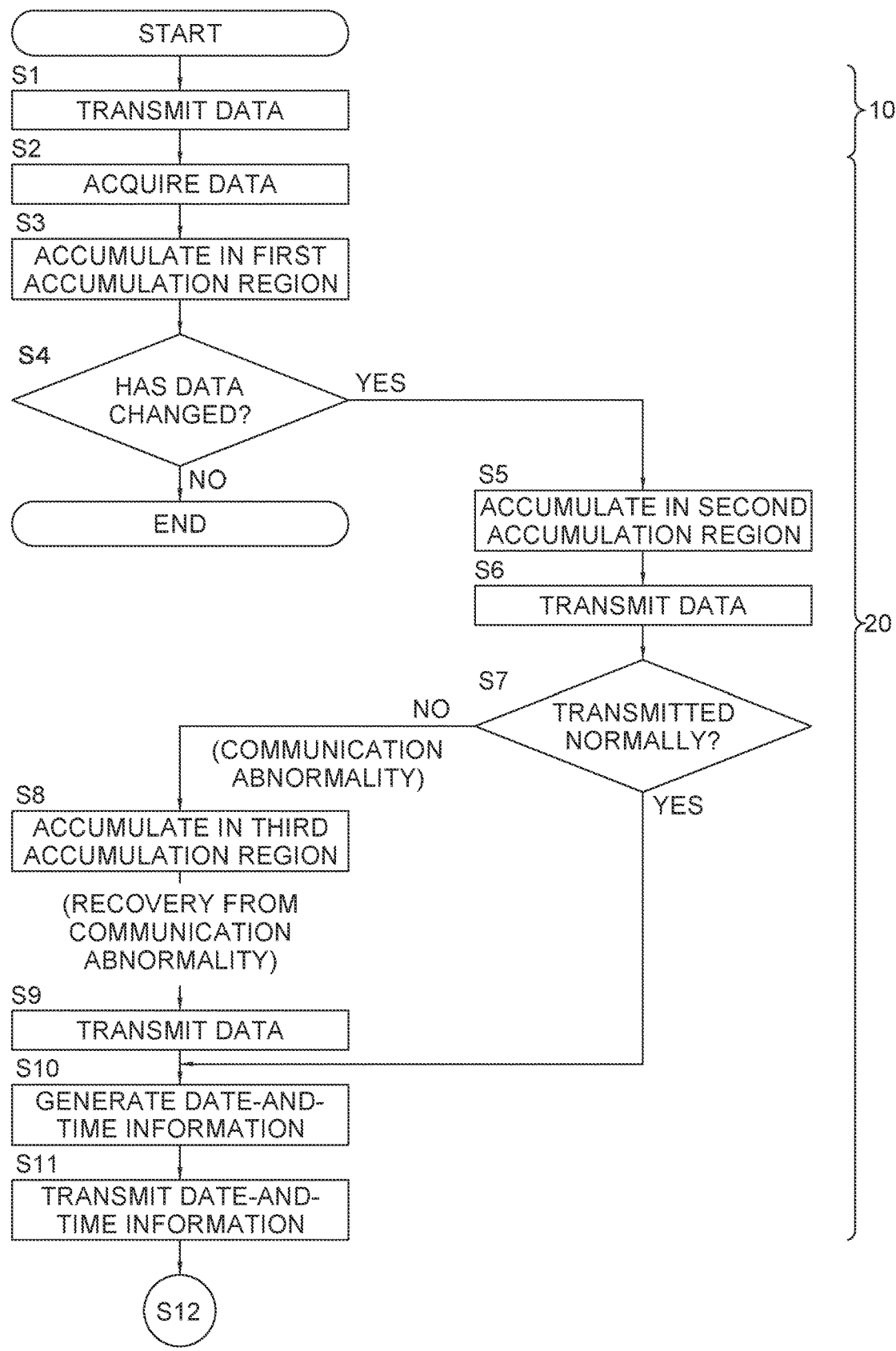
FIG. 8 is a schematic diagram illustrating processing in the data collection system.
Figure 9:
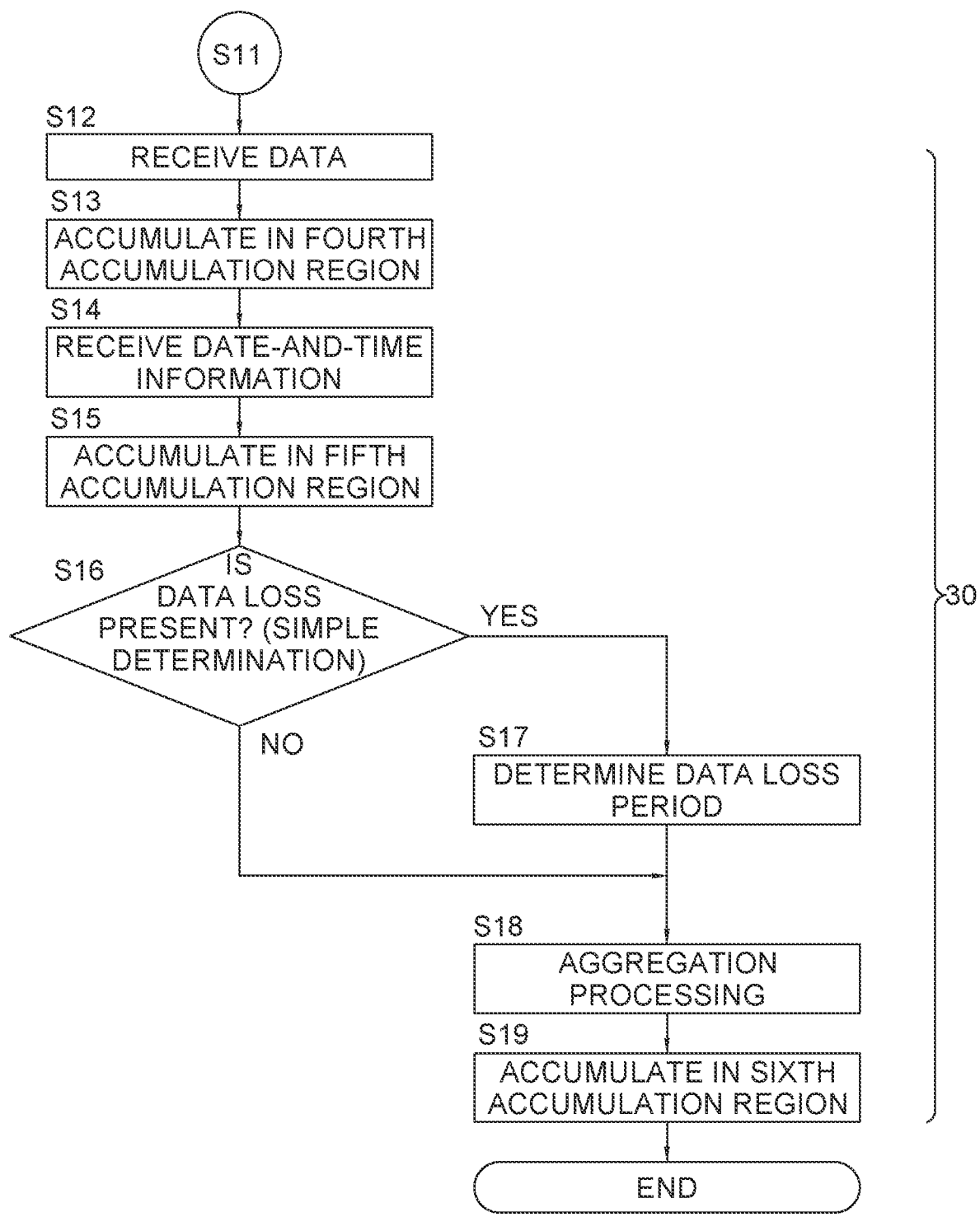
FIG. 9 is a schematic diagram illustrating processing in the data collection system.

FIGS. 8 and 9 are a schematic diagram for explaining a process flow in the data collection system 1 according to the present embodiment. Here, a data collection method related to data x on a state related to power ON/OFF of the indoor unit 12a will be described. FIGS. 8 and 9 illustrate the process flow in a relationship among one air conditioner 10, one transmission-side apparatus 20, and one reception-side apparatus 30, but the number is not limited to this.

First, the outdoor control unit 11X and the indoor control unit 12X of the air conditioner 10 acquire the data x (a state related to power ON/OFF of the indoor unit 12a) at every predetermined period. The acquired data x is temporarily stored in the memory and transmitted to the transmission-side apparatus 20 via the connection unit 11Y (step S1).

The data acquisition unit 23a of the transmission-side apparatus 20 acquires the data x from the air conditioner 10 via the transmission-side connection unit 24 (step S2). The acquired data x is accumulated in the first accumulation region 21a of the transmission-side storage unit 21 (step S3). At the same time, the data change determination unit 23b determines whether the data x has changed compared with the most recent data x (step S4). If it is determined in step S4 that the data x acquired in step S2 has not changed, the transmission-side apparatus 20 ends the processing.

On the other hand, if it is determined in step S4 that the data x acquired in step S2 has changed, the data acquisition unit 23a performs processing of accumulating the data x in the first accumulation region 21a and the second accumulation region 21b of the transmission-side storage unit 21 (step S5). The data change determination unit 23b further performs processing of transmitting the data x to the reception-side apparatus 30 via the transmission-side transmission unit 22a (step S6).

The data transmission determination unit 23c determines whether the transmission processing of the data x in step S6 is normally completed (step S7). In other words, the data transmission determination unit 23c detects an abnormality in communication with the reception-side apparatus 30. If no abnormality is detected in the communication with the reception-side apparatus 30 in step S7, the data transmission determination unit 23c ends the process (moves to step S10). On the other hand, if an abnormality in the communication with the reception-side apparatus 30 is detected in step S7, the data transmission determination unit 23c performs processing of accumulating the data x that has failed to be normally transmitted to the reception-side apparatus 30 in the third accumulation region 21c of the transmission-side storage unit 21 (step S8). Then, if the abnormality in the communication with the reception-side apparatus 30 is recovered, the data transmission determination unit 23c performs processing of transmitting the data x to the reception-side apparatus 30 (step S9).

At a predetermined timing that is set in advance, the date-and-time-information generation unit 23f generates date-and-time information y indicating that all the data x up to a predetermined period has been transmitted to the reception-side apparatus 30 (step S10). Here, if a certain communication abnormality occurs at the predetermined timing that is set in advance, the date-and-time-information generation unit 23f generates the date-and-time information y at a timing after recovery from the communication abnormality and transmission of untransmitted data. Note that the certain communication abnormality refers to a case where an abnormality occurs in the communication between the transmission-side apparatus 20 and the reception-side apparatus 30 or a case where the power source of the transmission-side apparatus 20 is cut off.

The date-and-time information y generated by the date-and-time-information generation unit 23f is transmitted to the reception-side apparatus 30 via the transmission-side communication unit 22 (step S11).

The data acquisition unit 33a of the reception-side apparatus 30 acquires, via the reception-side communication unit 32, the data x transmitted normally in step S7 or the data x transmitted in step S9 (step S12). The acquired data x is accumulated in the fourth accumulation region 31a of the reception-side storage unit 31 (step S13).

The reception-side apparatus 30 receives the date-and-time information y via the reception-side communication unit 32 (step S14). If the reception-side apparatus 30 receives the date-and-tune information y, the reception-side apparatus 30 performs processing of associating one or more pieces of the data x up to the date and time included in the date-and-time information y and accumulating them in the fifth accumulation region 31b of the reception-side storage unit 31 as a data aggregate (step S15).

The data loss determination unit 33b of the reception-side apparatus 30 performs, at a predetermined timing, simple determination processing as to whether a data loss is present in the one or more pieces of the data x accumulated in the fifth accumulation region 31b (step S16). The simple determination processing in step S16 is performed on the basis of information about a communication state.

If the data loss determination unit 33b of the reception-side apparatus 30 simply determines that there is a possibility of a data loss, the data loss determination unit 33b performs processing of determining whether a data loss is present and the data loss occurrence period in more detail on the basis of the information on the time at which the abnormality occurs in the communication with the transmission-side apparatus 20, information on the accumulation start date and time and the accumulation end date and time associated with the untransmitted data received from the transmission-side apparatus 20, and the date-and-time information y generated by the date-and-time-information generation unit 23f of the transmission-side apparatus 20 (step S17).

The data aggregation processing unit 33c performs aggregation processing of the data aggregate accumulated in the fifth accumulation region 31b (step S18). The data aggregate subjected to the aggregation processing in the data aggregation processing unit 33c is accumulated in the sixth accumulation region 31c of the reception-side storage unit 31 (step S19). At this time, the data aggregation processing unit 33c can perform the aggregation processing by using the results of the processing by the data loss determination unit 33b in step S16 and step S17.

(6) Characteristics 6-1

The data collection system 1 according to the present disclosure is a system that collects the data x of the air conditioner 10 as a monitoring target. The data collection system 1 includes the transmission-side apparatus 20 and the reception-side apparatus 30. The transmission-side apparatus 20 includes the data acquisition unit 23a as an acquisition unit and the transmission-side transmission unit 22a as a transmission unit. The data acquisition unit 23a acquires the data x from the air conditioner 10. The transmission-side transmission unit 22a transmits the data x to the reception-side apparatus 30 if the data x has changed. The reception-side apparatus 30 includes the reception-side reception unit 32b as a reception unit and the data loss determination unit 33b as a determination unit. The reception-side reception unit 32b receives the data x from the transmission-side apparatus 20. The data loss determination unit 33b determines whether a data loss is present.

In the related art, a system that monitors a device by collecting the data x about the device is operated. Some of such systems include a transmission-side apparatus that is connected to the device and acquires the data x from a sensor or the like mounted on the device, and a reception-side apparatus that collects the data x acquired by the transmission-side apparatus. In such a system, if a certain abnormality occurs in the transmission-side apparatus or the reception-side apparatus, a loss may occur in the data x collected by the reception-side apparatus in some cases.

In the data collection system 1 according to the present disclosure, the reception-side apparatus 30 includes the data loss determination unit 33b and determines whether a data loss is present. Thus, if it is determined that a data loss is present, it is possible to take measures such as requesting the transmission-side apparatus 20 for untransmitted data accumulated by the transmission-side apparatus 20 or not performing aggregation processing or the like performed in the data collection system 1. Thus, it is possible to ensure the accuracy of the result of the aggregation processing or the like performed in the data collection system 1.

6-2

The reception-side apparatus 30 of the data collection system 1 according to the present disclosure acquires information about a communication state with the transmission-side apparatus 20. On the basis of the information about the communication state, the data loss determination unit 33b further determines a data loss period.

In addition, if an abnormality is detected in the communication with the reception-side apparatus 30, the transmission-side apparatus 20 of the data collection system 1 according to the present disclosure accumulates the data x. If the abnormality is recovered in the communication with the reception-side apparatus 30, the transmission-side apparatus 20 transmits, to the reception-side apparatus 30, accumulation data that is the data x accumulated, an accumulation start date and time of the accumulation data, and an accumulation end date and time of the accumulation data. The data loss determination unit 33b of the reception-side apparatus 30 further determines the data loss period. The data loss period is determined on the basis of the accumulation data, the accumulation start date and time of the accumulation data, and the accumulation end date and time of the accumulation data received from the transmission-side apparatus 20. If the data x is accumulated, the accumulation end date and time of the accumulation data is continuously updated.

The reception-side apparatus 30 of the data collection system 1 according to the present disclosure further receives, in addition to the data x, date-and-time information y indicating up to which point in time the transmission-side apparatus 20 has transmitted the data x. On the basis of the date-and-time information y, the reception-side apparatus 30 determines whether the data x untransmitted is present in the transmission-side apparatus 20.

This enables the data collection system 1 to determine the data loss period in more detail. On the basis of the determined data loss period, the data collection system 1 can check whether the data x untransmitted is present or the like.

6-3

The transmission-side apparatus 20 and the reception-side apparatus 30 of the data collection system 1 according to the present disclosure are continuously connected to each other. In response to interruption of the connection between the transmission-side apparatus 20 and the reception-side apparatus 30, the reception-side apparatus 30 detects the abnormality.

If the transmission-side apparatus 20 detects the abnormality in the communication with the reception-side apparatus 30, the reception-side apparatus 30 of the data collection system 1 according to the present disclosure does not execute aggregation processing of the data x of the air conditioner 10.

This enables the data collection system 1 to obtain a more accurate result of the aggregation processing of the data x. It is possible to ensure the accuracy of the result of the aggregation processing or the like performed in the data collection system 1.

6-4

In the data collection system 1 according to the present disclosure, if a power source of the transmission-side apparatus 20 is restored, the transmission-side apparatus 20 transmits the accumulation data and the data x of the air conditioner 10 in a current state to the reception-side apparatus 30.

It is possible to ensure the accuracy of the result of the aggregation processing or the like performed in the data collection system 1.

6-5

The reception-side apparatus 30 of the data collection system 1 according to the present disclosure collects data x of a monitoring target by communicating with a transmission-side apparatus 20. The reception-side apparatus 30 includes the reception-side reception unit 32b as a reception unit and the data loss determination unit 33b as a determination unit. The reception-side reception unit 32b receives the data x from the transmission-side apparatus 20 if the data x has changed. The data loss determination unit 33b determines whether a data loss is present.

6-6

A data collection method in the data collection system 1 according to the present disclosure is a data collection method in the data collection system 1 that collects the data x of the air conditioner 10 by the communication between the transmission-side apparatus 20 and the reception-side apparatus 30. The data collection method includes the acquisition step S2, the transmission step S3, the reception step S10, and the determination step S14. In the acquisition step S2, the transmission-side apparatus 20 acquires the data x from the air conditioner 10. In the transmission step S3, the transmission-side apparatus 20 transmits the data x to the reception-side apparatus 30 if the data x has changed. In the reception step S10, the reception-side apparatus 30 receives the data x from the transmission-side apparatus 20. In the determination step S14, the reception-side apparatus 30 determines whether a data loss is present.

Thus, if it is determined that a data loss is present, it is possible to take measures such as requesting the transmission-side apparatus 20 for lost data x or not performing aggregation processing or the like performed in the data collection system 1. In addition, it is possible to ensure the accuracy of the result of the aggregation processing or the like performed in the data collection system 1.

(7) Modifications 7-1

The reception-side apparatus 30 illustrated in the present disclosure includes the reception-side transmission unit 32a as a transmission unit. The reception-side transmission unit 32a can transmit, to another apparatus, information about whether a data loss is present, determined by the data loss determination unit 33b. Thus, even if aggregation processing or the like is performed in another apparatus, it is possible to take measures such as not performing aggregation processing if a data loss is present.

7-2

The reception-side apparatus 30 illustrated in the present disclosure may perform the aggregation processing if acquiring, from the transmission-side apparatus 20, information indicating that there is no untransmitted data. The information indicating that there is no untransmitted data is transmitted from the transmission-side apparatus 20 to the reception-side apparatus 30. It is possible to ensure the accuracy of the result of the aggregation processing or the like performed in the data collection system 1.

8

Although the embodiment of the present disclosure has been described above, it should be understood that various changes can be made on the forms and details without departing from the spirit and scope of the present disclosure described in the claims.

The invention claimed is:
1. A data collection system configured to collect data of a monitoring target, the data collection system comprising:
   a transmission-side apparatus including
      an acquisition unit configured to acquire the data from the monitoring target, and
      a transmission unit configured to transmit the data if the data has changed; and
   a reception-side apparatus including
      a reception unit configured to receive the data from the transmission-side apparatus, and a determination unit configured to determine whether a data loss is present, if an abnormality is detected in communication with the reception-side apparatus, the transmission-side apparatus accumulates the data, if the abnormality is recovered in the communication with the reception-side apparatus, the transmission-side apparatus transmits, to the reception-side apparatus, accumulation data that is the data accumulated, an accumulation start date and time of the accumulation data, and an accumulation end date and time of the accumulation data, and based on the accumulation data, the accumulation start date and time of the accumulation data, and the accumulation end date and time of the accumulation data received from the transmission-side apparatus, the determination unit of the reception-side apparatus being further configured to determine the data loss period.

2. The data collection system according to claim 1, wherein the reception-side apparatus is configured to acquire information about a communication state with the transmission-side apparatus, and based on the information about the communication state, the determination unit is further configured to determine a data loss period.

3. The data collection system according to claim 1, wherein, if the data is accumulated, the accumulation end date and time of the accumulation data is continuously updated.

4. The data collection system according to claim 1, wherein the transmission-side apparatus and the reception-side apparatus are continuously connected to each other, and in response to interruption of the connection between the transmission-side apparatus and the reception-side apparatus, the reception-side apparatus is configured to detect the abnormality.

5. The data collection system according to claim 1, wherein the reception-side apparatus is further configured to receive date-and-time information in addition to the data, and based on the date-and-time information, determine whether the data untransmitted is present in the transmission-side apparatus.

6. The data collection system according to claim 1, wherein if the transmission-side apparatus detects the abnormality in the communication with the reception-side apparatus, the reception-side apparatus does not execute aggregation processing of the data of the monitoring target.

7. The data collection system according to claim 1, wherein if a power source of the transmission-side apparatus is restored, the transmission-side apparatus transmits the accumulation data and the data of the monitoring target in a current state to the reception-side apparatus.

8. A reception-side apparatus configured to collect data of a monitoring target by communicating with a transmission-side apparatus, the reception-side apparatus comprising:

a reception unit configured to receive the data from the transmission-side apparatus if the data has changed; and a determination unit configured to determine whether a data loss is present, if an abnormality is detected in communication with the reception-side apparatus, the transmission-side apparatus accumulates the data, if the abnormality is recovered in the communication with the reception-side apparatus, the transmission-side apparatus transmits, to the reception-side apparatus, accumulation data that is the data accumulated, an accumulation start date and time of the accumulation data, and an accumulation end date and time of the accumulation data, and based on the accumulation data, the accumulation start date and time of the accumulation data, and the accumulation end date and time of the accumulation data received from the transmission-side apparatus, the determination unit of the reception-side apparatus being further configured to determine the data loss period.

9. The reception-side apparatus according to claim 8, further comprising:

a transmission unit configured to transmit information about whether the data loss is present, which is determined by the determination unit, to another apparatus.

10. A data collection method in a data collection system that collects data of a monitoring target by communication between a transmission-side apparatus and a reception-side apparatus, the data collection method comprising:

the transmission-side apparatus acquiring the data from the monitoring target;

the transmission-side apparatus transmitting the data to the reception-side apparatus if the data has changed;

the reception-side apparatus receiving the data from the transmission-side apparatus; and the reception-side apparatus determining whether a data loss is present, if an abnormality is detected in communication with the reception-side apparatus, the transmission-side apparatus accumulates the data, if the abnormality is recovered in the communication with the reception-side apparatus, the transmission-side apparatus transmits, to the reception-side apparatus, accumulation data that is the data accumulated, an accumulation start date and time of the accumulation data, and an accumulation end date and time of the accumulation data, and based on the accumulation data, the accumulation start date and time of the accumulation data, and the accumulation end date and time of the accumulation data received from the transmission-side apparatus, the determination unit of the reception-side apparatus being further configured to determine the data loss period.

* * * * *